(12) United States Patent
Klepsch

(10) Patent No.: US 6,537,632 B1
(45) Date of Patent: *Mar. 25, 2003

(54) PEELABLE, HEAT-SEALABLE FOIL

(76) Inventor: Liliana Klepsch, Autokaderstrasse 29, A-1210 Vienna (AT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/576,838

(22) Filed: Dec. 21, 1995

Related U.S. Application Data

(63) Continuation of application No. 08/094,202, filed as application No. PCT/AT93/00031 on Feb. 24, 1993, now abandoned.

(30) Foreign Application Priority Data

Feb. 24, 1992 (AT) ................................. 345/92

(51) Int. Cl.[7] ................... C08F 236/06; C08F 293/00
(52) U.S. Cl. ................ 428/36.92; 428/35.7; 428/36.6; 428/36.8; 428/216; 428/349; 428/355 BL; 525/88; 525/98
(58) Field of Search ............ 525/88, 98; 428/36.8, 428/66.4, 216, 349, 355 BL, 35.7, 36.6, 36.92

(56) References Cited

U.S. PATENT DOCUMENTS

| | | | |
|---|---|---|---|
| 4,075,285 A | 2/1978 | Tabana et al. | 260/876 B |
| 4,080,407 A * | 3/1978 | Fodor | 260/880 B |
| 4,104,326 A * | 8/1978 | Fodor | 260/876 B |
| 4,588,099 A | 5/1986 | Diez | 215/232 |

FOREIGN PATENT DOCUMENTS

| | | |
|---|---|---|
| EP | 0 251 636 | 1/1988 |
| EP | 0 318 794 | 6/1989 |
| EP | 0 406 681 | 1/1991 |
| FR | 2 247 397 | 5/1975 |
| FR | 2 263 277 | 10/1975 |
| GB | 1473506 * | 5/1977 |
| JP | 55-154262 (S HO * | 5/1980 |
| JP | 57034921 A * | 2/1982 |
| JP | 58108112 A * | 6/1983 |
| JP | 01133735 A * | 5/1989 |

OTHER PUBLICATIONS

*Concise Polymeric Materials Encyclopedia*, ed. Joseph C. Salamone, CRC Press, pp. 1516–1517 (1999(.*

*Handbook of Thermoplastics*, ed. Olagoke Olabisi, Marcel Dekker, Inc.pp. 353–361, 1997.*

Database WPIL, Week 0681, Derwent Publications Ltd., London, GB, AN 81–08597D (No date given).

* cited by examiner

Primary Examiner—Sandra M. Nolan
(74) Attorney, Agent, or Firm—Pitney, Hardin, Kipp & Szuch LLP

(57) ABSTRACT

A peelable, heat-sealable foil for closing containers, for example cups, of synthetic plastics material, in particular polystyrene, consists of one single, biaxially oriented layer of impact-resistant polystyrene, in admixture with a styrene-butadiene-double-blockcopolymer.

3 Claims, No Drawings

PEELABLE, HEAT-SEALABLE FOIL

This is a continuation application of application Ser. No. 08/094,202, filed Oct. 8, 1993 and now abandoned which was filed as PCT/AT93/00031 filed Feb. 24, 1993.

BACKGROUND OF THE INVENTION

The invention refers to a peelable, heat-sealable foil of impact-resistant polystyrene for closing containers, for example cups, of synthetic plastics material.

Containers of plastics material, which contain foodstuffs, must, as a rule, be air-tightly closed for reliably preserving the foodstuffs. Also other articles are frequently offered in plastic containers closed by a foil.

For example, it is known for a long time to close cups containing dairy products, such as cream, sweet cream, yoghourt or the like, by aluminum foil, which is connected by the rim of the cup by means of a heat-sealing varnish. In this case, a disadvantage results in the high energy consumption required for producing the aluminum.

It has also been proposed to close such containers with foils of synthetic plastics material, for example polyester foils or foils of hard PVC, equally being connected to the rim of the container by means of a heat-sealing varnish. Also the use of such foils is expensive on account of the required heat-sealable varnish. The same disadvantage is also encountered when using as closure means laminates of paper and polyester, which laminates are equally connected to the rim of the container by means of a heat-sealable varnish. Furthermore, the residual solvents having [its] origin in the sealing layer can be removed from the synthetic plastics material only with considerable effort.

In the dairy industry, the containers consist as a rule of polystyrene or polypropylene. The described foils then consist of a foreign material. Recently, efforts are undertaken in numerous countries to collect used containers and to recycle such containers. Such recycling is in case of closing foils including a foreign material either extremely expensive or not possible at all, because the closing foil remains, as a rule, adhered to the container rim and the consumer can not be expected to completely remove this closing foil prior to collection of the containers.

For this reason, it has been proposed to produce a closing foil of polystyrene, so that the container and the closing foil consist of materials of the same type and are thus suitable to be subjected to a common recycling process and separation of the closing foil from the container is not necessary. Such heat-sealable foils, i.e. foils being suitable to be connected to the rim of the container without the use of a heat-sealing varnish are, however, required to be operable at a sealing temperature preventing adhesion of the foil on the sealing tool, on the one hand, and to reliably provide a sufficient connection between the foil and the container rim, on the other hand, and to be in spite thereof easily be peelable off the container rim for the purpose of opening the container.

From the DE-OS 39 21 677 there has become known a sealable foil of synthetic plastics material which consists of at least two, preferably of three, layers, i.e. of a heat-sealable polystyrene layer, of a main layer of highly impact-resistant polystyrene and optionally of a heat-protecting layer of a substantially more heat-resistant synthetic plastics material than polystyrene, for example PBT. This heat-protective layer serves the purpose to prevent any adhesion of the foil on the sealing tool and to prevent deformation of the underlying polystyrene layers under the action of the pressure and of the temperature of the sealing tool.

It is a drawback that such foils being composed of a plurality of foils must be produced in a relatively expensive manner according to the co-extrusion process and tend to delaminate when being peeled from the foil, in particular in case of low thicknesses of the foils of, for example, 0.12 mm.

SUMMARY OF THE INVENTION

The present invention has as an object to avoid the mentioned drawbacks and to provide a peelable and heat-sealable foil of impact-resistant polystyrene for closing containers of synthetic plastics material, which foil can easily be manufactured, has the strength required for resisting the stress in particular during transport, can be given a small thickness for the purpose of performing the sealing operation in a rapid manner at a lower temperature as compared with known foils and for the purpose of preventing adhesion on the sealing tool and can easily be peeled off the container without any tendency to tearing when being peeled off. For solving this task, the invention proposes that the foil consists of one single, biaxially oriented layer.

For the purpose of providing the biaxial orientation, the impact-resistant polystyrene foil, which is preferably produced according to the extrusion process, is stretched in two directions, whereby the random arrangement of the fibrous polystyrene molecules becomes oriented and the impact resistance and the stiffness of the foil is substantially improved as compared with a foil having not been biaxially oriented. Such a foil can thus be given a small thickness and in spite thereof reliably be given the required strength, thus being in the position to operate the sealing process at lower temperatures at which no special precautions must be made for preventing adhesion of the foil on the sealing tool. On account of the biaxial orientation, the strength of the foil is maintained to a sufficient degree even within the sealing area being weakened by notches, so that the foil is not subjected to tearing when being peeled from the container rim in spite of the required tension force and thus can be peeled off as a single piece.

It has proved convenient that the foil consists of impact-resistant polystyrene in admixture with a styrene-butadiene di-block copolymer. On account of the finely divided lamellar structure of the butadiene phase of the styrene-butadiene-blockcopolymer, there is formed a sealing component already at low temperatures, which component can be removed when peeling off the cover, provided that the foil has been correspondingly strengthened by being given a biaxial orientation.

DETAILED DESCRIPTION OF THE PREFERRED EMBODIMENT

The foil preferably consists of 20 percent by weight to 98 percent by weight of impact-resistant polystyrene and of 2 percent by weight to 80 percent by weight of styrene-butadiene di-block copolymer.

As a raw material for producing the biaxially oriented foil has been well proved, for example, highly impact-resistant polystyrene containing butadiene in a proportion of 8 percent, having a VICAT-number of 95° C. (DIN 53460 process A) and having a melt index of 3 g/10 min (according to DIN 53735, 200° C./5 kp), said highly impact-resistant polystyrene having been mixed with approximately 15 percent of a styrene-butadiene-di-block copolymer.

The optimum thickness of the foil is within the range between 0.08 mm and 0.06 mm.

The temperature of the sealing head is conveniently in the range between 150° C. and 170° C., the specific sealing pressure being between 4 and 50 bar.

The foil according to the invention is, as a rule, unobjectionably removable from a sealing tool being provided with a layer of polytetrafluoroethylene. Even when using sealing tools of steel or bronze, which tools are not covered, there is observed an only low-non-disturbing adhesion when observing the mentioned temperatures. On account of the foil being, as a rule, printed according to the offset printing process or the flexo printing process without any pretreatment, the use of a heat-protecting varnish for protecting the colors within the sealing area is advantageous. The overlying covering varnish, which is, as a rule, applied in one single machine operation together with the imprinting, equally facilitates removal from a non-covered sealing tool.

The inventive cover foil seals also to polyethylene terephthalate and polyvinyl chloride.

In the following, there are provided those results which were obtained during three sealing tests made with cover members out of an inventive foil having an original thickness of 80 μm, the diameter of the cover members being 65 mm with a width of the sealing web of 3 mm.

| Sealing force | 200 kp | 200 kp | 200 kp |
| --- | --- | --- | --- |
| Sealing temperature | 160° C. | 165° C. | 170° C. |
| Sealing time | 0.70 s | 0.70 s | 0.70 s |
| Peelability (100% Evaluation 5 0% Evaluation 0) | 5 | 5 | 5 |
| Bursting pressure (minimum 300 mbar) | 344 | 374 | 358 |
|  | 334 | 365 | 371 |
|  | 350 | 347 | 354 |
|  | 356 | 386 | 323 |
|  | 323 | 360 | 368 |
| Average value | 341 | 366 | 355 |
| Opening force (minimum: 3 N maximum: 10 N) | 3.84 | 9.47 | 9.24 |
|  | 7.46 | 7.34 | 8.81 |
|  | 6.88 | 9.31 | 8.60 |
|  | 8.97 | 3.17 | 8.15 |
|  | 7.52 | 9.31 | 4.11 |
| Average value | 6.93 | 7.72 | 7.78 |

What is claimed is:

1. In combination, a container adhered to a cover without adhesive, said cover comprising a peelable, heat sealable foil of a single layer of biaxially oriented polymer film, wherein the film consists of 20% to 98% by weight of impact resistant polystyrene-butadiene copolymer and 2% to 80% by weight of styrene-butadiene diblock copolymer.

2. A container and cover according to claim 1, wherein the foil has a thickness between 0.06 and 0.08 mm.

3. A container and cover according to claim 1, wherein the container is a cup.

* * * * *